(12) United States Patent
Yu et al.

(10) Patent No.: US 10,560,385 B2
(45) Date of Patent: Feb. 11, 2020

(54) METHOD AND SYSTEM FOR CONTROLLING NETWORK DATA TRAFFIC IN A HIERARCHICAL SYSTEM

(71) Applicant: ALIBABA GROUP HOLDING LIMITED, George Town, Grand Cayman (KY)

(72) Inventors: Kui Yu, Hangzhou (CN); Peile Duan, Hangzhou (CN); Shan Li, Hangzhou (CN); Jiangwei Huang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 5 days.

(21) Appl. No.: 15/891,281

(22) Filed: Feb. 7, 2018

(65) Prior Publication Data

US 2018/0167326 A1  Jun. 14, 2018

Related U.S. Application Data

(63) Continuation of application No. PCT/CN2016/092818, filed on Aug. 2, 2016.

(30) Foreign Application Priority Data

Aug. 11, 2015 (CN) .......................... 2015 1 0491100

(51) Int. Cl.
*H04L 1/00* (2006.01)
*H04L 12/801* (2013.01)
*H04L 29/08* (2006.01)

(52) U.S. Cl.
CPC ............ *H04L 47/19* (2013.01); *H04L 69/329* (2013.01)

(58) Field of Classification Search
CPC ....... H04L 47/19; H04L 69/329; H04L 63/20; G06F 9/50; G06F 21/60
See application file for complete search history.

(56) References Cited

U.S. PATENT DOCUMENTS

| 7,324,447 B1* | 1/2008 | Morford | ................. H04L 41/08 370/231 |
| 2014/0137184 A1* | 5/2014 | Russello | ................. G06F 21/60 726/1 |

(Continued)

FOREIGN PATENT DOCUMENTS

| CN | 101651672 A | 2/2010 |
| CN | 101825991 A | 9/2010 |

(Continued)

OTHER PUBLICATIONS

First Chinese Office Action issued in Chinese Application No. 201510491100.3, dated Apr. 2, 2019 (18 pages).

(Continued)

*Primary Examiner* — Abdelnabi O Musa
(74) *Attorney, Agent, or Firm* — Finnegan, Henderson, Farabow, Garrett & Dunner, LLP

(57) ABSTRACT

The present application provides methods and systems for limiting data traffic. According to some embodiments, one exemplary method includes: determining, at an application layer, one or more parent process objects corresponding to a service object; creating at least one corresponding child process object by using the parent process objects respectively, and allocating a maximum input/output (I/O) bandwidth threshold for the child process object and prompting, when it is detected that the child process object inputs or outputs a network data packet, an operating system kernel layer to limit data traffic of the network data packet according to the maximum I/O bandwidth threshold. Embodiments (Continued)

of the present application can improve the stability of network isolation.

18 Claims, 7 Drawing Sheets

(56) References Cited

U.S. PATENT DOCUMENTS

| | | |
|---|---|---|
| 2015/0078431 A1 | 3/2015 | Sung |
| 2015/0149611 A1* | 5/2015 | Lissack ............... H04L 43/0817 709/224 |
| 2016/0080207 A1* | 3/2016 | Prakash .................. H04L 69/16 370/231 |

FOREIGN PATENT DOCUMENTS

| | | |
|---|---|---|
| CN | 103533032 A | 1/2014 |
| WO | WO2012008016 A1 | 9/2013 |
| WO | WO2017/024965 A1 | 2/2017 |

OTHER PUBLICATIONS

First Chinese Search Report issued in Chinese Application No. 201510491100.3, dated Mar. 22, 2019 (1 page).
PCT International Search Report and Written Opinion dated Oct. 31, 2016, issued in corresponding International Application No. PCT/CN2016/092818 (14 pages).

* cited by examiner

METHOD AND SYSTEM FOR CONTROLLING NETWORK DATA TRAFFIC IN A HIERARCHICAL SYSTEM

CROSS REFERENCE TO RELATED APPLICATION

This present application claims priority to International Application No. PCT/CN2016/092818, filed Aug. 2, 2016, and claims priority to Chinese Patent Application No. 201510491100.3 filed on Aug. 11, 2015, both of which are incorporated herein by reference in their entireties.

TECHNICAL FIELD

The present application generally relates to the field of data processing technologies, and in particular, to methods and systems for limiting data traffic.

BACKGROUND

With the popularization of Internet technologies, the amount of data produced grows exponentially. Resources required for data processing has also increased tremendously. Nowadays, with the development of cloud computing platforms, efficient use of resources is critical. To achieve the goal of highly efficient use of resources, resource isolation technologies play an important part. Resource isolation technology provides different tasks with computing resources that can be used independently, thereby avoiding that the resources interfere with each other.

Among existing resource isolation technologies, process-based Cgroups (Control groups) are commonly used. Cgroups is a mechanism provided by a Linux kernel, which can isolate physical resources (such as CPU, memory, and IO) of the processes. Cgroups integrate the existing cpuset, Memory, net_cls and other subsystems, so that Cgroups are applicable to a variety of application scenarios from resource control for a single process to virtualization at an operating system level.

The net_cls subsystem is used to control network bandwidth of a single process. Net-cls subsysm does not directly control network reading and writing, but marks a network data packet by using a class identifier classid, so that a linux Traffic Control (TC) program identifies a data packet generated by a task in Cgroups in order to limit traffic.

However, linux Cgroups and a Traffic Control module have to be configured before net_cls can be used. In some experimental tests, the network isolation effect is not very good when only Cgroups are used, and the network bandwidth usage fluctuates greatly. Moreover, as Cgroups are built-in modules of the kernel, the flexibility thereof is inherently limited. Diversified requirements on network resources cannot be well met.

Therefore, there is a need for proposals of network isolation solutions with high applicability to improve the stability of network isolation.

SUMMARY

Embodiments of the present application provide methods for limiting data traffic to improve the stability of network isolation. Further, embodiments of the present application also provide systems for limiting data traffic.

In order to solve the above-mentioned problem, some embodiments of the present application provide methods for limiting data traffic, one exemplary method comprising determining, at an application layer, one or more parent process objects corresponding to a service object; creating at least one corresponding child process object by using the parent process objects respectively, and allocating a maximum input/output (I/O) bandwidth threshold for the child process object; and prompting, when it is detected that the child process object inputs or outputs a network data packet, an operating system kernel layer to limit data traffic of the network data packet according to the maximum I/O bandwidth threshold.

In some embodiments, the child process may have a child process identifier, and before the step of prompting, when it is detected that the child process object inputs or outputs a network data packet, an operating system kernel layer to limit data traffic of the network data packet according to the maximum I/O bandwidth threshold, the method further includes: sending, by using the parent process object, the child process identifier of the child process object and the corresponding maximum I/O bandwidth threshold to the operating system kernel layer, to prompt the operating system kernel layer to create a traffic limiting rule corresponding to the child process object, wherein the traffic limiting rule can include the child process identifier of the child process object and the corresponding maximum I/O bandwidth threshold.

In some embodiments, the step of prompting, when it is detected that the child process object inputs or outputs a network data packet, an operating system kernel layer to limit data traffic of the network data packet according to the maximum I/O bandwidth threshold further includes: pre-creating a socket descriptor fd by using the parent process object, wherein the socket fd is information that can be used when the child process object creates a network connection socket; sending the socket fd and the child process identifier of the corresponding child process object to the operating system kernel layer by using the parent process object, and sending the socket fd to the corresponding child process object by using the parent process object; and prompting, when it is detected that the child process object inputs or outputs a network data packet by using the socket fd. Moreover, the operating system kernel layer can perform the following operations: obtaining, by the operating system kernel layer, a corresponding socket structure according to the socket fd and the child process identifier of the corresponding child process object; adding the child process identifier to the network data packet when the network data packet passes through the socket structure; and searching, based on the child process identifier, for a traffic limiting rule that matches the network data packet to obtain the maximum I/O bandwidth threshold corresponding to the child process object, and limiting data traffic of the network data packet according to the maximum I/O bandwidth threshold.

In some embodiments, the method further includes: adaptively adjusting the maximum I/O bandwidth threshold of the child process object. This process may further include: determining a maximum I/O bandwidth threshold of a parent level, wherein the parent level is an object above the level of the child process object, which includes a service object or a physical machine; calculating, if the sum of maximum I/O bandwidth thresholds of all child process objects included in the parent level is greater than the maximum I/O bandwidth threshold of the parent level, a first average bandwidth threshold allocated for each of the child process objects according to the number of the child process objects; and keeping the maximum I/O bandwidth threshold of the child process object unchanged, if the maximum I/O bandwidth threshold of the child process object is less than the first average bandwidth threshold; or calculating a second average bandwidth threshold, if the maximum I/O bandwidth threshold of the child process object is greater than the first average bandwidth threshold, and adjusting the maximum I/O bandwidth threshold of the child process object to the second average bandwidth threshold. The second average bandwidth threshold can be calculated in the following manner: (the maximum I/O bandwidth threshold of the parent level—all maximum I/O bandwidth thresholds of child process objects whose maximum I/O bandwidth thresholds are less than the first average bandwidth threshold)/(the number of child process objects whose maximum I/O bandwidth thresholds are greater than the first average bandwidth threshold).

According to some embodiments of the present application, methods for limiting data traffic are provided. One method comprises: receiving, at an operating system kernel layer, a maximum I/O bandwidth threshold corresponding to at least one child process object sent by a parent process object, wherein the parent process object is associated with a service object, the child process object is a process object created by using the parent process object, and the maximum I/O bandwidth threshold is a bandwidth threshold allocated for the child process object when the child process object is created; and limiting, upon receipt of an input or output network data packet sent by the child process object, data traffic of the network data packet according to the maximum I/O bandwidth threshold corresponding to the child process object.

In some embodiments, the child process object may have a child process identifier. Before the step of limiting, upon receipt of an input or output network data packet sent by the child process object, data traffic of the network data packet according to the maximum I/O bandwidth threshold corresponding to the child process object, the method can further include: creating a traffic limiting rule corresponding to the child process object, wherein the traffic limiting rule can include the child process identifier of the child process object and the corresponding maximum I/O bandwidth threshold.

In some embodiments, the step of limiting, upon receipt of an input or output network data packet sent by the child process object, data traffic of the network data packet according to the maximum I/O bandwidth threshold corresponding to the child process object includes: receiving a pre-created socket fd and the child process identifier of the corresponding child process object that are sent by the parent process object, wherein the socket fd is information that can be used when the child process object creates a network connection socket; acquiring a corresponding socket structure according to the socket fd and the child process identifier of the corresponding child process object; receiving a network data packet that is input or output by the child process object by using the socket fd; adding the child process identifier to the network data packet when the network data packet passes through the socket structure; and searching, based on the child process identifier, for a traffic limiting rule that matches the network data packet to obtain the maximum I/O bandwidth threshold corresponding to the child process object, and limiting data traffic of the network data packet according to the maximum I/O bandwidth threshold.

In some embodiments, the step of searching, based on the child process identifier, for a traffic limiting rule that matches the network data packet to obtain the maximum I/O bandwidth threshold corresponding to the child process object, and limiting data traffic of the network data packet according to the maximum I/O bandwidth threshold includes: acquiring actual data traffic of the network data packet; searching, based on the child process identifier, for a traffic limiting rule that matches the network data packet to obtain the corresponding maximum I/O bandwidth threshold; and transmitting the network data packet according to the actual data traffic, if the actual data traffic is less than the maximum I/O bandwidth threshold; or transmitting the network data packet according to the maximum I/O bandwidth threshold, if the actual data traffic is greater than the maximum I/O bandwidth threshold.

In some embodiments, the method further includes: placing, if the actual data traffic is greater than the maximum I/O bandwidth threshold, data corresponding to remaining data traffic in the actual data traffic other than the maximum I/O bandwidth threshold in a buffer of a preset size; and sending an error prompt to the child process object if the amount of data stored in the buffer is the preset size.

In some embodiments, the method further includes: deleting the corresponding traffic limiting rule if it is detected that the child process object is deleted.

According to some embodiments of the present application, systems for limiting data traffic are provided, one system includes: a parent process determination module configured to determine, at an application layer, one or more parent process objects corresponding to a service object; a child process creation module configured to create at least one corresponding child process object by using the parent process objects respectively, and allocate a maximum I/O bandwidth threshold for the at least one child process object; and a first traffic limiting module configured to prompt, when it is detected that the child process object inputs or outputs a network data packet, an operating system kernel layer to limit data traffic of the network data packet according to the maximum I/O bandwidth threshold.

In some embodiments, the child process object may have a child process identifier, and the system can further include: an information sending module configured to send, by using the parent process object, the child process identifier of the child process object and the corresponding maximum I/O bandwidth threshold to the operating system kernel layer, to prompt the operating system kernel layer to create a traffic limiting rule corresponding to the child process object, wherein the traffic limiting rule can include the child process identifier of the child process object and the corresponding maximum I/O bandwidth threshold.

In some embodiments, the first traffic limiting module includes: a descriptor acquisition submodule configured to pre-create a socket descriptor fd by using the parent process object, wherein the socket fd is information that can be used when the child process object creates a network connection socket; and a descriptor sending submodule configured to send the socket fd and the child process identifier of the corresponding child process object to the operating system kernel layer by using the parent process object, and send the socket fd to the corresponding child process object by using the parent process object; and prompt, when it is detected that the child process object inputs or outputs a network data packet by using the socket fd. Moreover, the operating system kernel layer can perform the following operations: obtaining, by the operating system kernel layer, a corresponding socket structure according to the socket fd and the child process identifier of the corresponding child process object; adding the child process identifier to the network data packet when the network data packet passes through the socket structure; and searching, based on the child process identifier, for a traffic limiting rule that matches the network data packet to obtain the maximum I/O bandwidth threshold corresponding to the child process object, and limiting data traffic of the network data packet according to the maximum I/O bandwidth threshold.

In some embodiments, the system further includes: an adjustment module configured to adaptively adjust the maximum I/O bandwidth threshold of the child process object.

In some embodiments, the adjustment module can further include: a parent-level threshold determination submodule configured to determine a maximum I/O bandwidth threshold of a parent level, wherein the parent level is an object above the level of the child process object, which includes a service object or a physical machine; an average value calculation submodule configured to calculate, if the sum of maximum I/O bandwidth thresholds of all child process objects included in the parent level is greater than the maximum I/O bandwidth threshold of the parent level, a first average bandwidth threshold allocated for each of the child process objects according to the number of the child process objects; a threshold keeping submodule configured to keep the maximum I/O bandwidth threshold of the child process object unchanged, if the maximum I/O bandwidth threshold of the child process object is less than the first average bandwidth threshold; and a threshold adjustment submodule configured to calculate a second average bandwidth threshold, if the maximum I/O bandwidth threshold of the child process object is greater than the first average bandwidth threshold, and adjust the maximum I/O bandwidth threshold of the child process object to the second average bandwidth threshold. The second average bandwidth threshold can be calculated in the following manner: (the maximum I/O bandwidth threshold of the parent level—all maximum I/O bandwidth thresholds of child process objects whose maximum I/O bandwidth thresholds are less than the first average bandwidth threshold)/(the number of child process objects whose maximum I/O bandwidth thresholds are greater than the first average bandwidth threshold).

In some embodiments of the present application, systems for limiting data traffic are provided, one system including: a threshold receiving module configured to receive, at an operating system kernel layer, a maximum I/O bandwidth threshold corresponding to at least one child process object sent by a parent process object, wherein the parent process object is associated with a service object, the child process object is a process object created by using the parent process object, and the maximum I/O bandwidth threshold is a bandwidth threshold allocated for the child process object when the child process object is created; and a second traffic limiting module configured to limit, upon receipt of an input or output network data packet sent by the child process object, data traffic of the network data packet according to the maximum I/O bandwidth threshold corresponding to the child process object.

In some embodiments, the child process may have a child process identifier, and the system can further include: a rule creation module configured to create a traffic limiting rule corresponding to the child process object, wherein the traffic limiting rule can include the child process identifier of the child process object and the corresponding maximum I/O bandwidth threshold.

In some embodiments, the second traffic limiting module can further include: an information receiving submodule configured to receive a pre-created socket fd and the child process identifier of the corresponding child process object that are sent by the parent process object, wherein the socket fd is information that can be used when the child process object creates a network connection socket; a socket acquisition submodule configured to acquire a corresponding socket structure according to the socket fd and the child process identifier of the corresponding child process object; an identifier adding submodule configured to receive a network data packet that is input or output by the child process object by using the socket fd, and add the child process identifier to the network data packet when the network data packet passes through the socket structure; and a traffic limiting submodule configured to search, based on the child process identifier, for a traffic limiting rule that matches the network data packet to obtain the maximum I/O bandwidth threshold corresponding to the child process object, and limit data traffic of the network data packet according to the maximum I/O bandwidth threshold.

In some embodiments, the traffic limiting submodule includes: an actual traffic acquisition unit configured to acquire actual data traffic of the network data packet; a rule search unit configured to search, based on the child process identifier, for a traffic limiting rule that matches the network data packet to obtain the corresponding maximum I/O bandwidth threshold; a first transmission unit configured to transmit the network data packet according to the actual data traffic, if the actual data traffic is less than the maximum I/O bandwidth threshold; and a second transmission unit configured to transmit the network data packet according to the maximum I/O bandwidth threshold, if the actual data traffic is greater than the maximum I/O bandwidth threshold.

In some embodiments, the system further includes: a buffer module configured to place, if the actual data traffic is greater than the maximum I/O bandwidth threshold, data corresponding to remaining data traffic in the actual data traffic other than the maximum I/O bandwidth threshold in a buffer of a preset size; and an error prompt sending module configured to send an error prompt to the child process object if the amount of data stored in the buffer is the preset size.

In some embodiments, the system further includes: a rule deletion module configured to delete the corresponding traffic limiting rule, if it is detected that the child process object is deleted.

Compared with existing technology, embodiments of the present application have the following advantages. For example, in a distributed environment where multiple tenants share cluster resources, when one or more parent process objects corresponding to a service object are determined, the parent process objects create child process objects to process the service object, and maximum I/O bandwidth thresholds are allocated for the child process objects. In this way, maximum network input/output bandwidths that various processes on the same machine can use may not exceed the specified thresholds. Otherwise, traffic is limited to control the bandwidths to be below the maximum I/O bandwidth thresholds. Therefore, embodiments of the present applicant may help achieve the objective of multi-process network isolation without affecting the stability of the network, so as to meet network requirements of different service objects.

In addition, embodiments of the present application can be implemented in a programmable language (for example, C language), and thus can be integrated into another system more easily.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods according to some embodiments of the present disclosure, the scope of which is defined by the appended claims.

Figure 1:
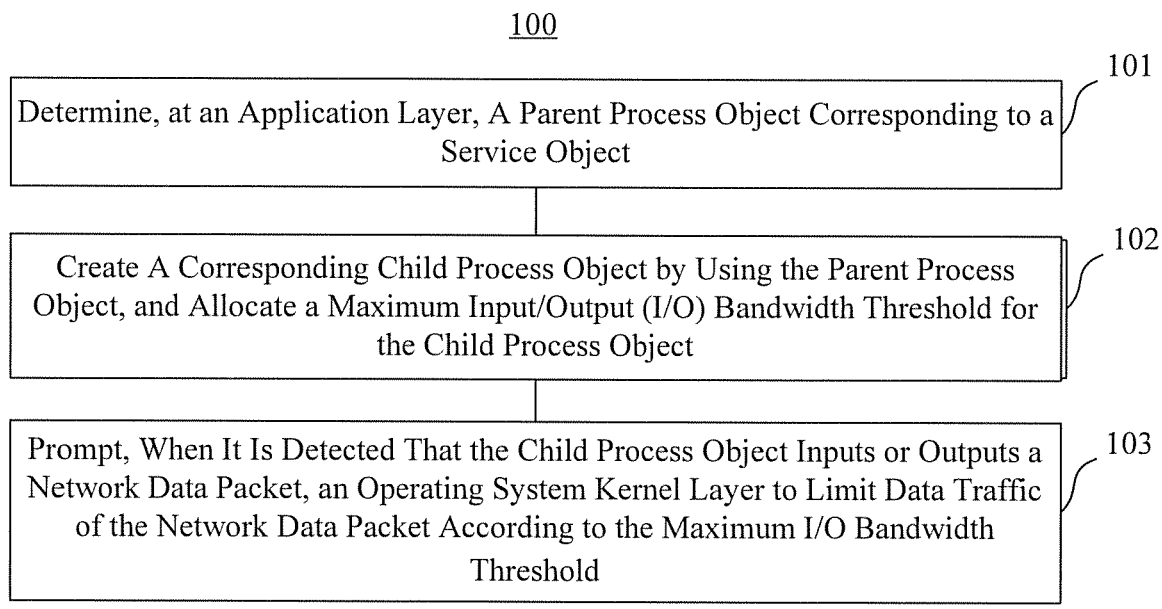
FIG. 1 is a flowchart of an exemplary method for limiting data traffic according to some embodiments of the present application.

FIG. 1 is a flowchart of an exemplary method 100 for limiting data traffic according to some embodiments of the present application. As an example, this method is described below from the perspective of an application layer. The method 100 may include the following steps:

In step 101, one or more parent process objects corresponding to a service object are determined at an application layer. For example, in an actual service scenario, large-scale cloud computing platforms are generally deployed in multiple data centers. Each data center may have multiple clusters. Each cluster may include a plurality of physical machines. Each physical machine may have different service objects running thereon. This is a typical cluster multi-tenancy mode.

In applying this exemplary method, one or more parent process objects that serve a service object may be first determined. A parent process object may be a process pre-created by an operating system, for example, a process commonly known as a daemon process, which is a background service process in Linux. A daemon process has a relatively long lifetime. It may be independent of a control terminal, and periodically execute a task or waiting to process some events upon occurrence thereof.

In step 102, at least one corresponding child process object is created by using the parent process objects respectively, and a maximum I/O bandwidth threshold is allocated for the child process object. For example, as shown in exemplary schematic diagram 200 of FIG. 2, after the parent process object is determined, parent process object 202 may further call a preset API interface to create at least one child process object 204 to process the service object, and configure a maximum I/O bandwidth threshold for child process object 204. The maximum I/O bandwidth threshold may refer to a maximum output bandwidth threshold or a maximum input bandwidth threshold. In some embodiments, it may include a maximum output bandwidth threshold as well as a maximum input bandwidth threshold.

Specifically, all service objects allocated to a physical machine may be first distributed to N (N>0) resident system daemon processes. These daemon processes, as parent process objects, may further create m (m>0) child process objects to run specific computing logics of the service object. Each of the created child process objects (e.g., such as child process object 204) may have a corresponding child process identifier (SubPID).

Figure 3:
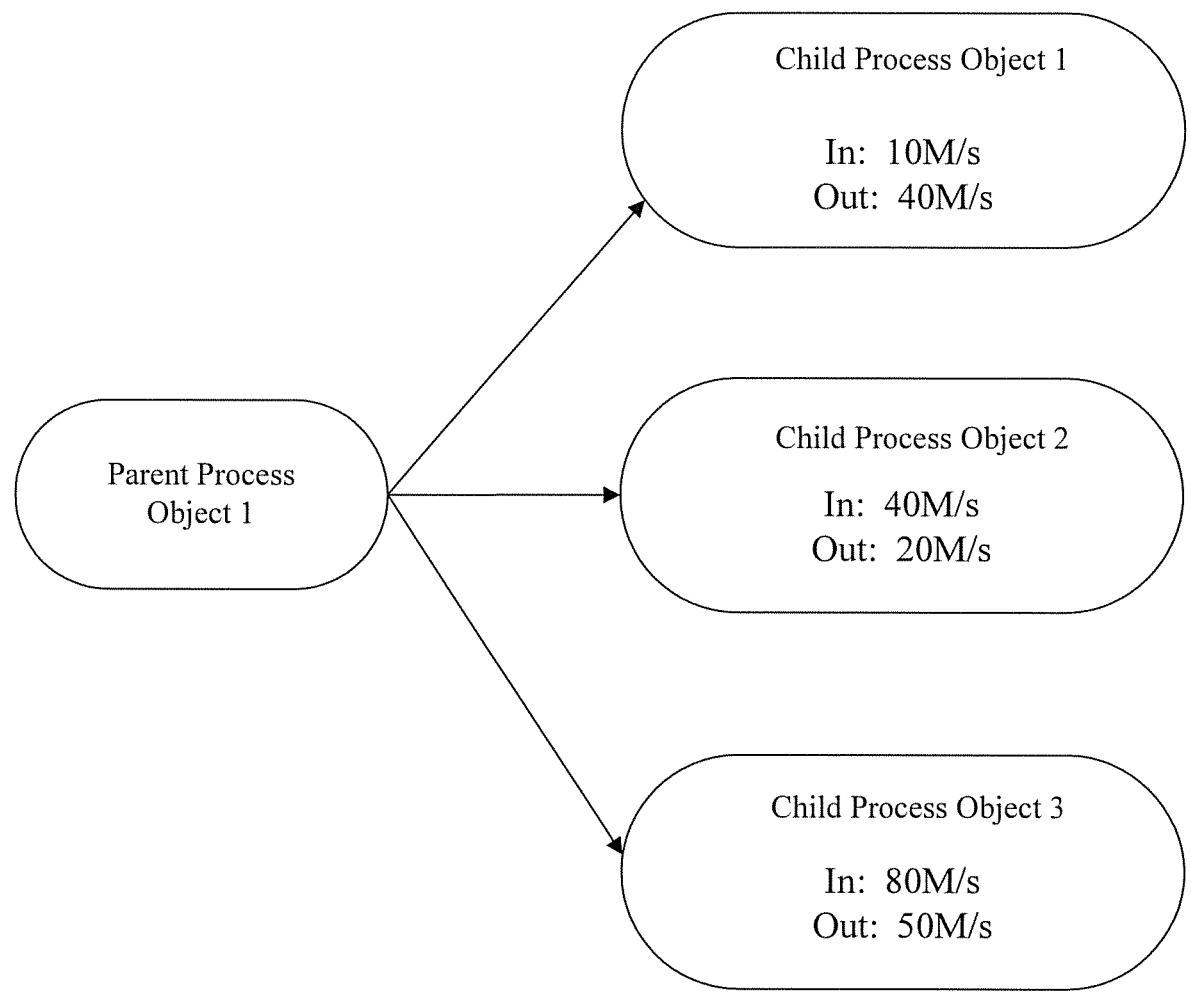
FIG. 3 is a schematic diagram of multi-process bandwidth allocation in an exemplary method for limiting data traffic according to some embodiments of the present application.

As user logic executed in a child process object may be transparent to the system, for the sake of security and resource isolation, a parent process object may allocate a maximum I/O bandwidth threshold for each child process object when creating the child process object. That is, the total network bandwidth usage of each child process may not exceed a specified quota, so as to limit the use of network resources thereof. As shown in the exemplary schematic diagram of FIG. 3, there can be two services on a physical machine. A parent process object 1 of a service 1 creates three child process objects, for which maximum input network bandwidths are specified to be 10 M/s, 40 M/s, and 80 M/s respectively, and maximum output network bandwidths are specified to be 40 M/s, 20 M/s, and 50 M/s respectively. In this example, if the maximum input/output bandwidth of the physical machine is 1000 M/s, thresholds for the network bandwidths that the three child process objects can use are the specified quotas.

It should be appreciated that, theoretically, one parent process object may create numerous child process objects, as long as the number of the child process objects can be supported in the linux operating system. A main function of the parent process object is to manage life cycles of the child process objects, for example, creating and destructing child process objects, allocating network bandwidths, monitoring network usage of each child process object, and so on.

According to some embodiments of the present application, the method 100 as shown in FIG. 1 may further include: sending, by using the parent process object, the SubPID of the child process object and the corresponding maximum I/O bandwidth threshold to the operating system kernel layer, to prompt the operating system kernel layer to create a traffic limiting rule corresponding to the child process object. The traffic limiting rule can include the SubPID of the child process object and the corresponding maximum I/O bandwidth threshold.

Figure 2:
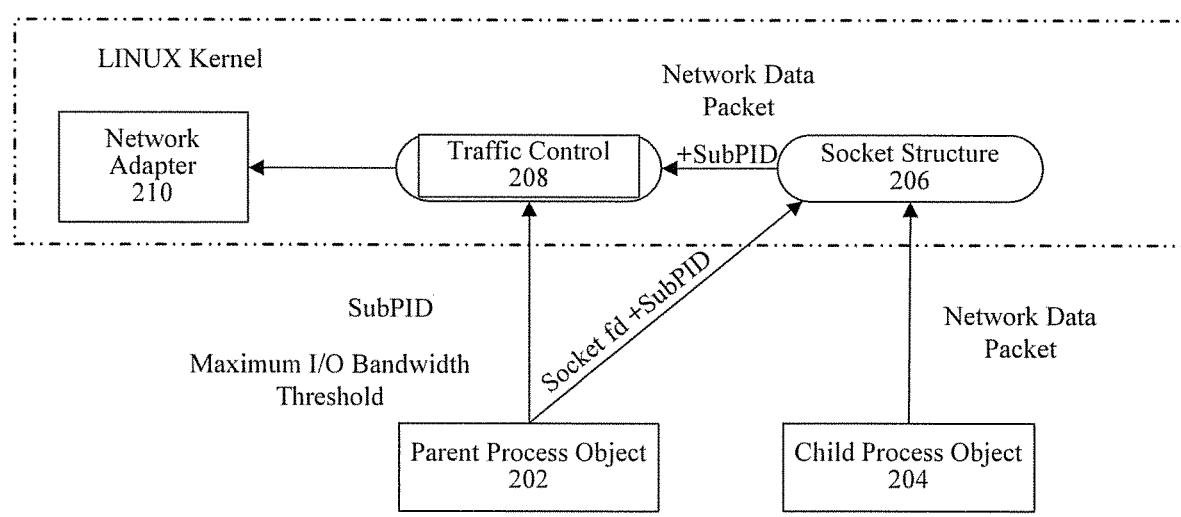
FIG. 2 is a schematic diagram of the working principle of limiting data traffic of an exemplary method for limiting data traffic according to some embodiments of the present application.

For example, as shown in FIG. 2, in some embodiments, when creating child process object 204, parent process object 202 may further send the SubPID of the child process object and the corresponding maximum I/O bandwidth threshold to the operating system kernel layer 206. Each time the parent process object creates a child process object, the parent process object may call an API interface encapsulated at the operating system application layer, for example, an AddGroup (GroupInfo) interface, so as to send information such as the SubPID of the child process object and a corresponding maximum I/O bandwidth threshold to the operating system kernel layer via GroupInfo. This may prompt the operating system kernel layer to create a corresponding traffic limiting rule according to the SubPID of the child process object and the corresponding maximum I/O bandwidth threshold. An example of this process performed at the operating system kernel layer will be further described below.

Referring back to FIG. 1, in step 103, when it is detected that the child process object inputs or outputs a network data packet, an operating system kernel layer is prompted to limit data traffic of the network data packet according to the maximum I/O bandwidth threshold.

In some embodiments, step 103 may further include the following substeps:

In substep S11, a socket descriptor fd is pre-created by using the parent process object, wherein the socket fd is information that can be used when the child process object creates a network connection socket.

In substep S12, the socket fd and the SubPID of the corresponding child process object are sent to the operating system kernel layer by using the parent process object. The socket fd is sent to the corresponding child process object by using the parent process object.

In substep S13, when it is detected that the child process object inputs or outputs a network data packet by using the socket fd, the operating system kernel layer is prompted to perform the following operations: obtaining, by the operating system kernel layer, a corresponding socket structure according to the socket fd and the SubPID of the corresponding child process object; adding the SubPID to the network data packet when the network data packet passes through the socket structure; and searching, based on the SubPID, for a traffic limiting rule that matches the network data packet to obtain the maximum I/O bandwidth threshold corresponding to the child process object, and limiting data traffic of the network data packet according to the maximum I/O bandwidth threshold.

For example, in some embodiments, the parent process object may pre-create a socket fd that can be used when each child process object creates a network connection socket. The parent process object may call another encapsulated API interface, for example, AddFd (subPID, fd), to send the socket fd and the SubPID of the corresponding child process object to the operating system kernel layer, and at the same time, send the socket fd to the corresponding child process object. When it is detected that the child process object inputs or outputs a network data packet by using the socket fd, the operating system kernel layer is prompted to perform the following operations: obtaining, by the operating system kernel layer, a corresponding socket structure according to the socket fd and the SubPID of the corresponding child process object; adding the SubPID to the network data packet when the network data packet passes through the socket structure; and searching, based on the SubPID, for a traffic limiting rule that matches the network data packet to obtain the maximum I/O bandwidth threshold corresponding to the child process object, and limiting data traffic of the network data packet according to the maximum I/O bandwidth threshold. The foregoing operations of the operating system kernel layer are further described below.

In some embodiments, the method 100 as shown in FIG. 1 may further include: adaptively adjusting the maximum I/O bandwidth threshold of the child process object. This process may further include the following substeps.

In substep S21, a maximum I/O bandwidth threshold of a parent level is determined. The parent level is an object above the level of the child process object, which includes, for example, a service object or a physical machine. As an example, the traffic limiting rules set in some embodiments can be hierarchical. A traffic limiting rule of a child level is constrained by a traffic limiting rule of a parent level. For example, the child level may be a child process object, and the parent level may be a service object or a physical machine.

If the parent level is a physical machine, the maximum I/O bandwidth threshold of the parent level is the total bandwidth of the physical machine.

If the parent level is a service object, the maximum I/O bandwidth threshold of the parent level is a maximum I/O bandwidth threshold of the service object. For example, in some embodiments, maximum I/O bandwidth thresholds that all child process objects of a service object on a physical machine can use may need to be defined, in order to avoid interfering with network usage of other service objects. In such cases, it is feasible to use the same API to create a parent Group, specify a maximum I/O bandwidth threshold that the service object can use, then create child process objects serving the service object, and specify an ID of the parent Group. All the child processes serving the service can then share the maximum I/O bandwidth threshold specified for the service object.

Based on different maximum I/O bandwidth thresholds specified for the parent level, the maximum I/O bandwidth threshold obtained after adjustment for the child process object may also be different. For example, the total bandwidth of the physical machine is 200 M/s, a traffic limiting rule r1 is then set, in which a maximum output bandwidth threshold is 100 M/s. Two traffic limiting rules r2 and r3 may be further created, in which maximum output bandwidth thresholds are both 80 M/s. If parent levels to which r2 and r3 belong are not specified during creation, the parent level is, like r1, the physical machine by default, and the maximum output bandwidth threshold of the parent level is 200 M/s. If it is specified that r2 and r3 belong to the rule r1 during creation, the parent level of r2 and r3 is r1, and the maximum output bandwidth threshold of the parent level is 100 M/s.

In substep S22, if the sum of maximum I/O bandwidth thresholds of all child process objects included in the parent level is greater than the maximum I/O bandwidth threshold of the parent level, a first average bandwidth threshold allocated for each of the child process objects is calculated according to the number of the child process objects.

After the maximum I/O bandwidth threshold of the parent level is determined, it may be further determined whether the sum of maximum I/O bandwidth thresholds of all child process objects included in the parent level is greater than the maximum I/O bandwidth threshold of the parent level. If it is determined that the sum of maximum I/O bandwidth thresholds of all child process objects included in the parent level is not greater than the maximum I/O bandwidth threshold of the parent level, it indicates that resources of the current parent level can meet requirements of the maximum I/O bandwidth thresholds of all the child process objects. If the sum of maximum I/O bandwidth thresholds of all child process objects included in the parent level is greater than the maximum I/O bandwidth threshold of the parent level, it indicates that the resources of the current parent level cannot meet the requirements of the maximum I/O bandwidth thresholds of all the child process objects. In such cases, an average bandwidth threshold (the first average bandwidth threshold) occupied by each of the child process objects is further calculated.

For example, a total maximum output bandwidth of a physical machine is 100 M/s, child process objects 1, 2, 3, 4, and 5 are created in sequence, and allocated maximum output bandwidths are 10 M/s, 20 M/s, 40 M/s, 80 M/s, and 120 M/s respectively. As the sum of the maximum output bandwidth thresholds of the five child process objects (10 M/s+20 M/s+40 M/s+80 M/s+120 M/s=270 M/s) is greater than the total maximum output bandwidth 100 M/s of the physical machine, it may be further calculated in this case that the first average bandwidth threshold occupied by each of the child process objects is 100/5=20 M/s.

In substep S23, if a maximum I/O bandwidth threshold of a child process object is less than the first average bandwidth threshold, the maximum I/O bandwidth threshold of the child process object is kept unchanged.

In substep S24, if the maximum I/O bandwidth threshold of the child process object is greater than the first average bandwidth threshold, a second average bandwidth threshold is calculated, and the maximum I/O bandwidth threshold of the child process object is adjusted to the second average bandwidth threshold.

Specifically, if a maximum I/O bandwidth threshold of a child process object is less than the first average bandwidth threshold, the maximum I/O bandwidth threshold thereof may be kept unchanged. If the maximum I/O bandwidth threshold of the child process object is greater than the first average bandwidth threshold, a second average bandwidth threshold is further calculated. The second average bandwidth threshold may be calculated in the following manner:

(the maximum I/O bandwidth threshold of the parent level–all maximum I/O bandwidth thresholds of child process objects whose maximum I/O bandwidth thresholds are less than the first average bandwidth threshold)/(the number of child process objects whose maximum I/O bandwidth thresholds are greater than the first average bandwidth threshold).

For example, in the above example, for the child process objects 1, 2, 3, 4, and 5 created in sequence, a process of adaptively adjusting the maximum output bandwidth threshold that each process can reach each time after a new child process object is created can be as follows:

When the child process object 1 is created, as the allocated maximum output bandwidth of 10 M/s does not exceed the total maximum output bandwidth 100 M/s of the physical machine, the maximum output bandwidth of the child process object 1 is kept unchanged (10 M/s).

Then the child process object 2 is created. As the sum of maximum output bandwidths of the child process object 1 and the child process object 2 (10+20=30 M/s) does not exceed the total maximum output bandwidth 100 M/s of the physical machine, the maximum output bandwidths of the child process object 1 and the child process object 2 are kept unchanged (10 M/s, 20 M/s).

Then the child process object 3 is created. As the sum of maximum output bandwidths of the child process object 1 to the child process object 3 (10+20+40=70 M/s) does not exceed the total maximum output bandwidth 100 M/s of the physical machine, the maximum output bandwidths of the child process object 1 to the child process object 3 are kept unchanged (10 M/s, 20 M/s, 40 M/s).

Then the child process object 4 is created. As the sum of maximum output bandwidths of the child process object 1 to the child process object 4 (10+20+40+80=150 M/s) exceeds the total maximum output bandwidth 100 M/s of the physical machine, the maximum output bandwidths of the child process objects whose maximum I/O bandwidth thresholds are less than or equal to the first average bandwidth threshold are kept unchanged. That is, the maximum output bandwidths of the child process object 1 and the child process object 2 are kept unchanged; the maximum output bandwidths of the child process objects whose maximum I/O bandwidth thresholds are greater than the first average bandwidth threshold are adjusted to a second average bandwidth threshold. A method of calculating the second average bandwidth threshold is: (100−10−20)/2=35, that is, the adjusted maximum output bandwidth thresholds of the child processes 1 to 4 are (10 M/s, 20 M/s, 35 M/s, 35 M/s).

Then the child process object 5 is created. As the sum of maximum output bandwidths of the child object 1 to the child process object 5 (10+20+40+80+120=270 M/s) exceeds the total maximum output bandwidth 100 M/s of the physical machine, the maximum output bandwidths of the child process objects whose maximum I/O bandwidth thresholds are less than or equal to the first average bandwidth threshold are kept unchanged. That is, the maximum output bandwidths of the child process object 1 and the child process object 2 are kept unchanged. The maximum output bandwidths of the child process objects whose maximum I/O bandwidth thresholds are greater than the first average bandwidth threshold (i.e., 20 M/s) are adjusted to a second average bandwidth threshold. A method of calculating the second average bandwidth threshold is: (100−10−20)/3=23, that is, the adjusted maximum output bandwidth thresholds of the child processes 1 to 5 are (10 M/s, 20 M/s, 23 M/s, 23 M/s, 23 M/s).

It should be appreciated that, in practice, the adaptive adjustment result of each child process object obtained above may have a minor fluctuation error of approximately 5%. Overall, all the processes share the output/input bandwidth within the threshold range.

By adaptively adjusting maximum I/O bandwidth thresholds of child process objects as described above, the objective of flexibly and accurately controlling the maximum input/output bandwidths of the processes can be achieved.

It should be appreciated that, in this example described above, the operating system may upgrade an online running process in a pluggable manner, and the upgrade process does not affect normal operation of the process. In some embodiments, a dlopen function (which functions to open a dynamic link library and return a handle of the dynamic link library) may be used to dynamically load code of the above-described exemplary methods to upgrade a process. This way, the process under operation can transparently load and unload the code of the above exemplary methods.

Embodiments of this application can be applied in a distributed environment. When one or more parent process objects corresponding to a service object are determined, the parent process objects can create child process objects to process the service object. Maximum I/O bandwidth thresholds are allocated for the child process objects. In this way, maximum network input/output bandwidths that various processes on the same machine can use cannot exceed specified thresholds. Otherwise, traffic is limited to control the bandwidths to be below the maximum I/O bandwidth thresholds, to achieve the objective of multi-process network isolation without affecting the stability of the network, thereby meeting network requirements of different service objects.

In addition, some embodiments of the present application can be implemented in a programmable language (for example, C language), and thus can be integrated into another system more easily.

Figure 4:
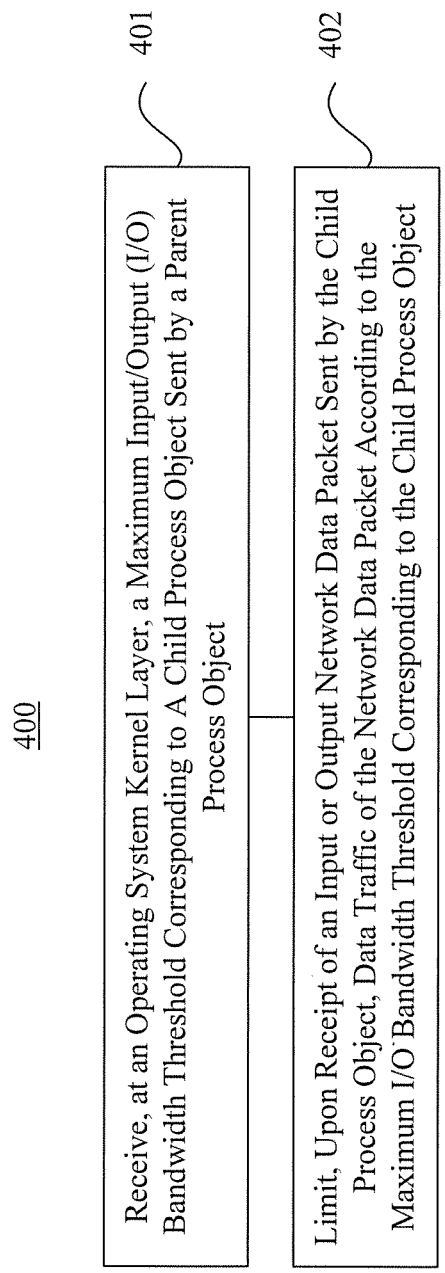
FIG. 4 is a flowchart of an exemplary method for limiting data traffic according to some embodiments of the present application.

FIG. 4 is a flowchart of an exemplary method 400 for limiting data traffic according to some embodiments of the present application. The exemplary method 400 is described from the perspective of an operating system kernel layer, which may include the following steps.

In step 401, a maximum I/O bandwidth thresholds corresponding to at least one child process object sent by a parent process object is received at an operating system kernel layer.

In this example, the parent process object is associated with a service object, in a multiple-to-multiple relationship. The child process object is a process object created by using the parent process object, and one parent process object may create one or more child process objects. The maximum I/O bandwidth threshold is a bandwidth threshold allocated for the child process objects when the child process objects are created by the parent process object. The maximum I/O bandwidth threshold can be a maximum output bandwidth threshold or a maximum input bandwidth threshold. In some embodiments, the maximum I/O bandwidth threshold may include a maximum output bandwidth threshold as well as a maximum input bandwidth threshold.

For example, after a parent process object of a service object is determined, the parent process object may further call a preset API interface to create at least one child process object to process the service object, and configure a maximum I/O bandwidth threshold for each of the created child process objects.

Each time the parent process object creates a child process object, the parent process object may further call an API interface encapsulated at an operating system application layer, for example, an AddGroup (GroupInfo) interface, to send information such as the SubPID of the child process object and a corresponding maximum I/O bandwidth threshold to the operating system kernel layer via GroupInfo.

At the operating system kernel layer, information transmitted by the parent process object such as the SubPID of the child process object and the corresponding maximum I/O bandwidth threshold may be received by using a built-in Traffic Control (TC) of a kernel.

After the operating system kernel layer receives the information from the application layer, this exemplary method may further include creating a traffic limiting rule corresponding to the child process object.

For example, the operating system kernel layer may create, in the TC, a traffic limiting rule corresponding to the child process object according to the SubPID of the child process object and the corresponding maximum I/O bandwidth threshold, wherein the traffic limiting rule can include the SubPID of the child process object and the corresponding maximum I/O bandwidth threshold.

In some embodiments, the traffic limiting rule stored in the TC may be identified with a machine's globally unique rule ID. As the SubPID of the child process object is also globally unique, the SubPID of the child process object may be used as the rule ID. That is, classid of the TC can be assigned with the SubPID.

In an actual implementation, regardless of the number of parent process objects and the number of child process objects created by each parent process object on a physical machine, traffic limiting rules corresponding to each child process object in the TC use a bandwidth in a fair manner. However, the built-in TC of the linux kernel may have the following defect: traffic limiting rules corresponding to all child process objects under a same parent process object cannot share in a fully fair way a rule bandwidth set by the parent process object. This results in that some traffic limiting rules are short of bandwidths; that is, the bandwidths are occupied by other traffic limiting rules all the time. In view of this, in applying some embodiments of the present application, a hotfix (hotfix is an applet released for a specific system vulnerability or security issue to address the vulnerability or security issue, generally referred to as a patch) technology may be employed to fix the defect.

For example, the hotfix technology may be employed to optimize HTB (Hierarchical Token Bucket) and SFQ (Stochastic Fairness Queuing) queues implemented by the TC by default, so that all the traffic limiting rules can share a bandwidth fairly. The HTB queue is a type of classifiable queue in the TC, and mainly cooperates with the TC to perform traffic control. The SFQ is a simple implementation in a fairness queuing algorithm family, and is mainly directed to a TCP session or UDP flow. The traffic is divided into a number of FIFO (First Input First Output) queues, each queue corresponding to one session. Data is sent in a simple round-robin way, and each session gets a sending opportunity in sequence. Such a manner is fair, ensuring that a session is not drowned out by other sessions.

In step 402, upon receipt of an input or output network data packet sent by the child process object, data traffic of the network data packet is limited according to the maximum I/O bandwidth threshold corresponding to the child process object.

After the traffic limiting rule associated with the child process object is created at the operating system kernel layer, all network flows created by the child process object can be associated with the traffic limiting rule created in the TC, to limit data traffic of the network flows by using the traffic limiting rule.

In some embodiments of the present application, step 402 may include the following substeps.

In substep S31, a pre-created socket fd and the SubPID of the corresponding child process object that are sent by the parent process object are received. The socket fd is information that can be used when the child process object creates a network connection socket.

In substep S32, a corresponding socket structure is acquired according to the socket fd and the SubPID of the corresponding child process object.

In some embodiments, the parent process object may pre-create a socket fd that can be used when each child process object creates a network connection socket, and call another encapsulated API interface, for example, AddFd (subPID, fd), to send the socket fd and the SubPID of the corresponding child process object to the operating system kernel layer. When the parent process object calls AddFD (subPID, fd), the interface may find, according to the socket fd and by using a setsockopt method provided by the linux system, a socket structure corresponding to a tcp connection at a kernel network layer, and label the socket structure with the SubPID.

In substep S33, a network data packet that is input or output by the child process object by using the socket fd is received.

In substep S34, when the network data packet passes through the socket structure, the SubPID is added to the network data packet.

When the child process object transmits the network data packet by using the socket fd and the network data packet passes through a network layer protocol stack socket structure of the kernel, the network data packet is labeled with the SubPID.

In substep S35, a traffic limiting rule that matches the network data packet is searched based on the SubPID to obtain a maximum I/O bandwidth threshold corresponding to the child process object. Data traffic of the network data packet is limited according to the maximum I/O bandwidth threshold.

For example, as shown in FIG. 2, when the network data packet labeled with SubPID passes through TC 208 once again, the corresponding traffic limiting rule in TC 208 may be found according to the label, to limit data traffic of the network data packet. That is, a traffic limiting rule with the same SubPID as that in the network data packet is found, and data traffic of the network data packet is limited according to a maximum I/O bandwidth threshold defined in the traffic limiting rule.

In some embodiments of the present application, substep S35 may further include the following substeps.

In substep S351, actual data traffic of the network data packet is acquired.

In substep S352, a traffic limiting rule that matches the network data packet is searched, based on the SubPID, to obtain the corresponding maximum I/O bandwidth threshold.

In substep S353, if the actual data traffic is less than the maximum I/O bandwidth threshold, the network data packet is transmitted according to the actual data traffic.

In substep S354, if the actual data traffic is greater than the maximum I/O bandwidth threshold, the network data packet is transmitted according to the maximum I/O bandwidth threshold.

In some embodiments, after the network data packet is associated with the traffic limiting rule, if the speed of the actual data traffic of the network data packet does not exceed the maximum I/O bandwidth threshold set in the traffic limiting rule, the actual data traffic has little influence on current network data communication. In such cases, the actual data traffic can be employed to transmit the network data packet.

If the speed of the actual data traffic of the network data packet exceeds the maximum I/O bandwidth threshold set in the traffic limiting rule, the data traffic of the network data packet is limited to the maximum I/O bandwidth threshold set in the traffic limiting rule.

In some embodiments, the above exemplary method may further include placing, if the actual data traffic is greater than the maximum I/O bandwidth threshold, data corresponding to remaining data traffic in the actual data traffic other than the maximum I/O bandwidth threshold in a buffer of a preset size; and sending an error prompt to the child process object if the amount of data stored in the buffer is the preset size.

In some embodiments, if the actual data traffic of the child process object exceeds the maximum I/O bandwidth threshold, data of the exceeding part may be placed in a buffer of a preset size as a network data packet to be sent. After the actual data traffic decreases below the maximum I/O bandwidth threshold, the data in the buffer can be sent out.

If the actual data traffic continuously exceeds the set maximum I/O bandwidth threshold, when the buffered network data packet to be sent exceeds the size of a default buffer of the linux kernel, the exceeding data may be discarded directly, and an error prompt can be sent to the child process object. The error prompt indicates to the child process that sending of the network data packet fails. In this case, the child process object may choose to retransmit the data.

For example, the default buffer of the linux kernel has a size of 50 M, a maximum output bandwidth threshold set for a child process object is 100 M/s, if actual data traffic of the child process object initially does not exceed 100 M/s, no data is placed in the buffer. If the actual data traffic of the child process object becomes 110 M/s at a certain moment, under the traffic limiting rule, the maximum flow rate is 100 M/s, and the extra 10 M/s data may be placed in the buffer. If such a situation lasts 5 s, that is, 10 M/s*5 s=50 M, the capacity 50 M of the buffer is fully occupied at this point.

Then, if the actual data traffic further exceeds the threshold, there is no place to put the extra data, and the kernel can directly discard the data.

In some embodiments, the above exemplary method may further include deleting the corresponding traffic limiting rule if it is detected that the child process object is deleted.

In some embodiments, each time a child process object is created, a traffic limiting rule is created in the kernel. However, the number of traffic limiting rules that the kernel can accommodate is limited. Therefore, reclaiming memory space occupied by unused traffic limiting rules can be very useful.

For example, in some embodiments, the operating system may define a proper upper limit for the number of rules at the application layer and start a background thread in each parent process object to destruct unused traffic limiting rules. One exemplary process can be: querying all existing traffic limiting rules of a service object; if a SubPID of a child process object corresponding to a traffic limiting rule does not exist, the API may be called to destruct the traffic limiting rule in the kernel. In this way, resources occupied by the traffic limiting rule are reclaimed, which can ensure that the resources are not leaked and improve system performance, without the concern regarding crash of the child process.

With the above-described embodiments, maximum bandwidth usage of each process is accurately controlled by setting the maximum I/O bandwidth threshold of the child process object. The network stability is not affected, and each process on a machine can fairly and stably share the network bandwidth within a threshold range.

Figure 5:
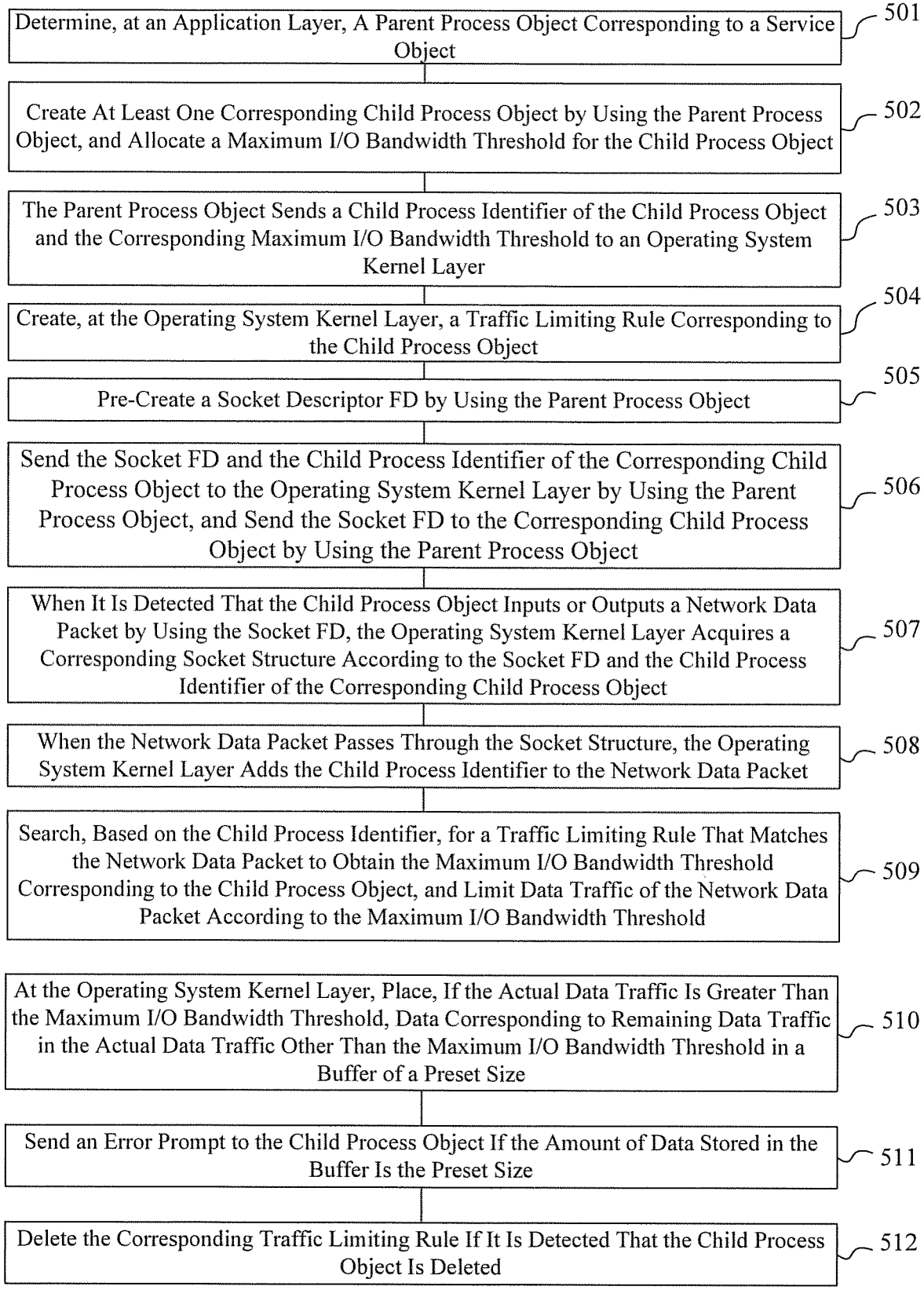
FIG. 5 is a flowchart of an exemplary method for limiting data traffic according to some embodiments of the present application.

FIG. 5 is a flowchart of an exemplary method 500 for limiting data traffic according to some embodiments of the present application. This exemplary method describes, in combination with FIG. 2, an interaction process between an application layer and an operating system kernel layer, which may include the following steps:

In step 501, one or more parent process objects corresponding to a service object are determined at an application layer.

In step 502, at least one corresponding child process object are created by using the parent process objects respectively, and a maximum I/O bandwidth threshold is respectively allocated for the child process objects.

In step 503, the parent process object sends the SubPID of the child process object and the corresponding maximum I/O bandwidth thresholds to an operating system kernel layer.

In step 504, a traffic limiting rule corresponding to the child process object is created at the operating system kernel layer.

In step 505, a socket descriptor fd is pre-created by using the parent process object. The socket fd is information that can be used when the child process object creates a network connection socket.

In step 506, the socket fd and the SubPID of the corresponding child process object are sent to the operating system kernel layer by using the parent process object, and the socket fd is sent to the corresponding child process object by using the parent process object.

In step 507, when it is detected that the child process object inputs or outputs a network data packet by using the socket fd, the operating system kernel layer acquires a corresponding socket structure according to the socket fd and the SubPID of the corresponding child process object.

In step 508, when the network data packet passes through the socket structure, the operating system kernel layer adds the SubPID to the network data packet.

In step 509, a traffic limiting rule that matches the network data packet is searched based on the SubPID, to obtain the maximum I/O bandwidth threshold corresponding to the child process object. Data traffic of the network data packet is limited according to the maximum I/O bandwidth threshold.

In some embodiments, step 509 may further include the following substeps:

In substep S41, actual data traffic of the network data packet is acquired.

In substep S42, a traffic limiting rule that matches the network data packet is searched based on the SubPID.

In substep S43, if the actual data traffic is less than the maximum I/O bandwidth threshold, the network data packet is transmitted according to the actual data traffic.

In substep S44, if the actual data traffic is greater than the maximum I/O bandwidth threshold, the network data packet is transmitted according to the maximum I/O bandwidth threshold.

In some embodiments, the maximum I/O bandwidth threshold of the child process object can be adaptively adjusted. For example, the process of adaptive adjustment can be as follows:

A. A maximum I/O bandwidth threshold of a parent level is determined, wherein the parent level is an object above the level of the child process object, which can include a service object or a physical machine.

B. If the sum of maximum I/O bandwidth thresholds of all child process objects included in the parent level is greater than the maximum I/O bandwidth threshold of the parent level, a first average bandwidth threshold allocated for each of the child process objects is calculated according to the number of the child process objects.

C. If the maximum I/O bandwidth threshold of the child process object is less than the first average bandwidth threshold, the maximum I/O bandwidth threshold of the child process object is kept unchanged.

D. If the maximum I/O bandwidth threshold of the child process object is greater than the first average bandwidth threshold, a second average bandwidth threshold is calculated, and the maximum I/O bandwidth threshold of the child process object is adjusted to the second average bandwidth threshold.

In step 510, at the operating system kernel layer, if the actual data traffic is greater than the maximum I/O bandwidth threshold, data corresponding to remaining data traffic in the actual data traffic other than the maximum I/O bandwidth threshold is placed in a buffer of a preset size.

In step 511, if the amount of data stored in the buffer is the preset size, an error prompt is sent to the child process object.

In step 512, if it is detected that the child process object is deleted, the corresponding traffic limiting rule is deleted in the operating system kernel.

The method 500 as shown in FIG. 5 may include steps or processes to those described above with reference to FIGS. 1 and 4, details of which are not repeated herein. Reference may be made to relevant parts described above.

It should be appreciated that, for ease of description, the foregoing method embodiments are described as a series of action combinations. However, those skilled in the art would appreciate that embodiments of the present application are not limited to the described sequences of the actions. Some steps may be performed in another sequence or at the same time in some embodiments. In addition, those skilled in the art would also appreciate that the embodiments described herein are exemplary only, and some steps described above may not necessarily be required in all embodiments.

Figure 6:
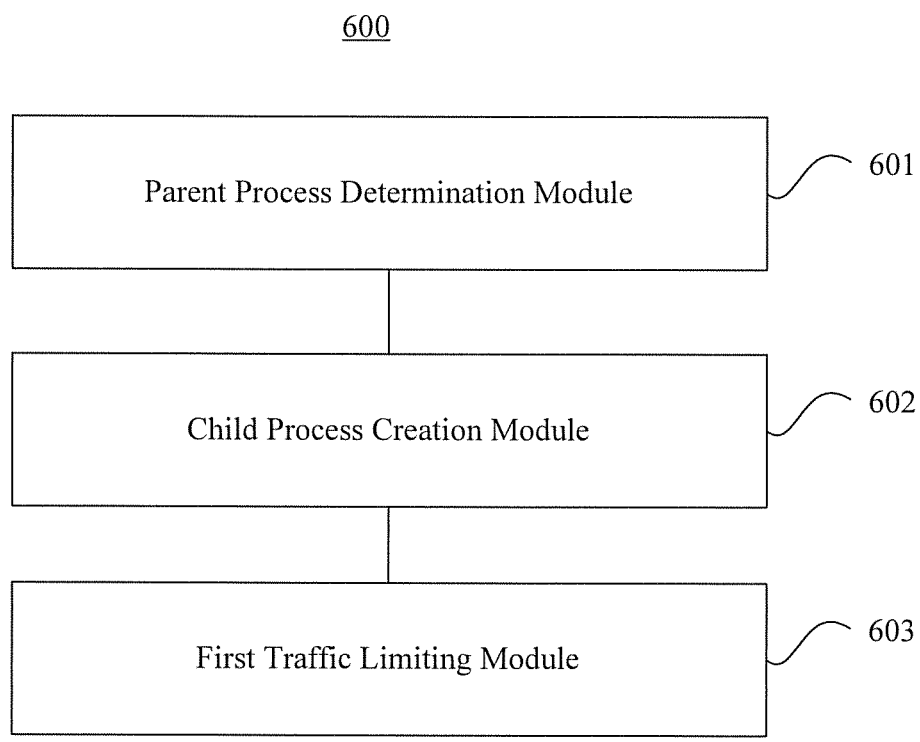
FIG. 6 is a structural block diagram of an exemplary system for limiting data traffic according to some embodiments of the present application.

FIG. 6 is a structural block diagram of an exemplary system 600 for limiting data traffic according to some embodiments of the present application. As shown in FIG. 6, the exemplary system 600 may include a parent process determination module 601, a child process creation module 602, and a first traffic limiting module 603.

Parent process determination module 601 can be configured to determine, at an application layer, one or more parent process objects corresponding to a service object.

Child process creation module 602 can be configured to create at least one corresponding child process object by using the parent process objects respectively, and to allocate a maximum I/O bandwidth threshold for the child process object.

First traffic limiting module 603 can be configured to prompt, when it is detected that the child process object inputs or outputs a network data packet, an operating system kernel layer to limit data traffic of the network data packet according to the maximum I/O bandwidth threshold.

In some embodiments, the child process may have a SubPID, and the system may further include an information sending module. The information sending module can be configured to send, by using the parent process object, the SubPID of the child process object and the corresponding maximum I/O bandwidth threshold to the operating system kernel layer, to prompt the operating system kernel layer to create a traffic limiting rule corresponding to the child process object. The traffic limiting rule includes the SubPID of the child process object and the corresponding maximum I/O bandwidth threshold.

In some embodiments, the first traffic limiting module 603 may further include a descriptor acquisition submodule and a descriptor sending submodule.

The descriptor acquisition submodule can be configured to pre-create a socket descriptor fd by using the parent process object. The socket fd is information that can be used when the child process object creates a network connection socket.

The descriptor sending submodule can be configured to send the socket fd and the SubPID of the corresponding child process object to the operating system kernel layer by using the parent process object. The descriptor sending submodule can also be configured to send the socket fd to the corresponding child process object by using the parent process object. Moreover, the descriptor sending submodule can be configured to prompt, when it is detected that the child process object inputs or outputs a network data packet by using the socket fd, the operating system kernel layer to perform additional operations. These operations may include obtaining, by the operating system kernel layer, a corresponding socket structure according to the socket fd and the SubPID of the corresponding child process object; adding the SubPID to the network data packet when the network data packet passes through the socket structure; and searching, based on the SubPID, for a traffic limiting rule that matches the network data packet, to obtain the maximum I/O bandwidth threshold corresponding to the child process object, and limiting data traffic of the network data packet according to the maximum I/O bandwidth threshold.

In some embodiments, the system 600 as shown in FIG. 6 may further include an adjustment module configured to adaptively adjust the maximum I/O bandwidth threshold of the child process object. The adjustment module may further include a parent-level threshold determination submodule, an average value calculation submodule, and a threshold adjustment submodule.

The parent-level threshold determination submodule can be configured to determine a maximum I/O bandwidth threshold of a parent level. The parent level can be an object above the level of the child process object, which includes a service object or a physical machine.

The average value calculation submodule can be configured to calculate, if the sum of maximum I/O bandwidth thresholds of all child process objects included in the parent level is greater than the maximum I/O bandwidth threshold of the parent level, a first average bandwidth threshold allocated for each of the child process objects according to the number of the child process objects.

The threshold keeping submodule can be configured to keep the maximum I/O bandwidth threshold of the child process object unchanged, if the maximum I/O bandwidth threshold of the child process object is less than the first average bandwidth threshold.

The threshold adjustment submodule can be configured to calculate a second average bandwidth threshold if the maximum I/O bandwidth threshold of the child process object is greater than the first average bandwidth threshold, and adjust the maximum I/O bandwidth threshold of the child process object to the second average bandwidth threshold. The second average bandwidth threshold can be determined in the following manner:

(the maximum I/O bandwidth threshold of the parent level−all maximum I/O bandwidth thresholds of child process objects whose maximum I/O bandwidth thresholds are less than the first average bandwidth threshold)/(the number of child process objects whose maximum I/O bandwidth thresholds are greater than the first average bandwidth threshold).

The system 600 described above with reference to FIG. 6 and the components therein may perform steps and processes similar to those described above with respect to the method embodiments, details of which is not repeated herein. For relevant parts, reference may be made to the description above.

Figure 7:
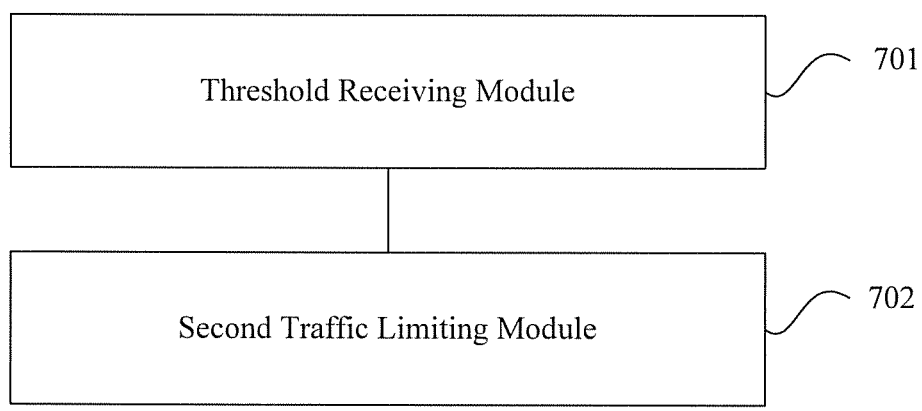
FIG. 7 is a structural block diagram of an exemplary system for limiting data traffic according to some embodiments of the present application.

FIG. 7 is a structural block diagram of another exemplary system 700 for limiting data traffic according to some embodiments of the present application. As shown in FIG. 7, this exemplary system 700 may include a threshold receiving module 701 and a second traffic limiting module 702.

Threshold receiving module 701 can be configured to receive, at an operating system kernel layer, a maximum I/O bandwidth threshold corresponding to at least one child process object sent by a parent process object. The parent process object is associated with a service object and the child process object is a process object created by using the parent process object. Further, the maximum I/O bandwidth threshold is a bandwidth threshold allocated for the child process object when the child process object is created by the parent process object.

Second traffic limiting module 702 can be configured to limit, upon receipt of an input or output network data packet sent by the child process object, data traffic of the network data packet according to the maximum I/O bandwidth threshold corresponding to the child process object.

In some embodiments, the child process may have a SubPID, and the system may further include a rule creation module configured to create a traffic limiting rule corresponding to the child process object. The traffic limiting rule can include the SubPID of the child process object and the corresponding maximum I/O bandwidth threshold.

In some embodiments, the second traffic limiting module 702 may further include an information receiving submodule, a socket acquisition submodule, an identifier adding submodule, and a traffic limiting submodule.

The information receiving submodule can be configured to receive a pre-created socket fd and the SubPID of the corresponding child process object that are sent by the parent process object. The socket fd is information that can be used when the child process object creates a network connection socket.

The socket acquisition submodule can be configured to acquire a corresponding socket structure according to the socket fd and the SubPID of the corresponding child process object.

The identifier adding submodule can be configured to receive a network data packet that is input or output by the child process object by using the socket fd. The identifier adding submodule can be configured to add the SubPID to the network data packet when the network data packet passes through the socket structure.

The traffic limiting submodule can be configured to search, based on the SubPID, for a traffic limiting rule that matches the network data packet to obtain the maximum I/O bandwidth threshold corresponding to the child process object, and limit data traffic of the network data packet according to the maximum I/O bandwidth threshold.

In some embodiments, the traffic limiting submodule may further include an actual traffic acquisition unit, a rule search unit, a first transmission unit, and a second transmission unit.

The actual traffic acquisition unit can be configured to acquire actual data traffic of the network data packet.

The rule search unit can be configured to search, based on the SubPID, for a traffic limiting rule that matches the network data packet, to obtain the corresponding maximum I/O bandwidth threshold.

The first transmission unit can be configured to transmit the network data packet according to the actual data traffic, if the actual data traffic is less than the maximum I/O bandwidth threshold.

The second transmission unit can be configured to transmit the network data packet according to the maximum I/O bandwidth threshold, if the actual data traffic is greater than the maximum I/O bandwidth threshold.

In some embodiments, the system may further include a buffer module and an error prompt sending module.

The buffer module can be configured to place, if the actual data traffic is greater than the maximum I/O bandwidth threshold, data corresponding to remaining data traffic in the actual data traffic other than the maximum I/O bandwidth threshold in a buffer of a preset size.

The error prompt sending module can be configured to send an error prompt to the child process object if the amount of data stored in the buffer is the preset size.

In some embodiments, the system may further include a rule deletion module configured to delete the corresponding traffic limiting rule if it is detected that the child process object is deleted.

The system and the components therein may perform steps and processes similar to those described above with respect to the method embodiments, details of which are not repeated herein. For related parts, reference may be made to the description above with respect to the method embodiments.

The examples describe above are described in a progressive manner, each may focus on a different aspect from other examples. For processes or operations described in one example, reference may be made to the similar processes or operations in another.

It should be appreciated that the embodiments of the present application may be provided as a method, an apparatus, or a computer program product. Therefore, the embodiments of the present application may be implemented in a hardware form, a software form, or a combination of software and hardware. Moreover, embodiments of the present application may be in the form of a computer program product implemented on one or more computer usable storage media including computer executable program codes.

The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The examples provided herein are described with reference to flowcharts and/or block diagrams of the method, terminal device (system) and computer program product of the embodiments of the present application. It should be appreciated that computer program instructions may be used to implement each process and/or block in the flowcharts and/or block diagrams and combinations of processes and/or blocks in the flowcharts and/or block diagrams. The computer program instructions may be provided to a computer, an embedded processor or a processor of another programmable data processing terminal device to generate a machine, such that the computer or the processor of another programmable data processing terminal device may execute the instructions to generate an apparatus configured to implement functions included in one or more processes in a flowchart and/or one or more blocks in a block diagram.

The computer program instructions may also be stored in a computer readable storage that can guide the computer or another programmable data processing terminal device to function in a specific manner, such that the instructions stored in the computer readable storage may generate an article of manufacture including an apparatus which may execute the instructions. The apparatus may perform functions described in one or more processes in a flowchart and/or one or more blocks in a block diagram.

The computer program instructions may also be installed in a computer or another programmable data processing terminal device, such that a series of operation steps are executed on the computer or the programmable terminal device to achieve processing implemented by a computer. The instruction executed in the computer or the programmable terminal device may perform steps or functions described above in one or more processes in a flowchart and/or one or more blocks in a block diagram.

The above-described examples are for explanation purposes only. It should be appreciated that those skilled in the art can make other variations and modifications in actual implementation. All such variations and modifications shall all fall within the scope of the embodiments of the present application.

Finally, it should be appreciated that, herein, the relation terms such as first and second are merely used to distinguish one entity or operation from another entity or operation. Such term do not necessarily require or imply such an actual relation or sequence between the entities or operations. Moreover, the terms "include," "comprise," or other variations thereof are intended to cover non-exclusive inclusion, so that a process, a method, an article, or a terminal device including a series of elements may not only include the elements described, but also other elements not clearly listed, or further include inherent elements of the process, method, article or terminal device. In the absence of specific limitations, an element defined by "including a/an . . . " does not exclude that the process, method, article or terminal device including elements other than those described therein.

Exemplary methods and systems for limiting data traffic provided in the present application are described above. The principles and implementation manners of the present application are described by using examples herein. The above description regarding certain embodiments is merely used to facilitate understanding of the present application and core ideas thereof. For those of ordinary skill in the art, there may be modifications to the specific implementation manners and application scopes according to the principles of the present application. The content of the specification shall not be construed as a limitation to the scope of the present application.

The invention claimed is:

1. A method for limiting data traffic, wherein the method comprises:
    determining, at an application layer, a parent process object corresponding to a service object;
    creating at least one corresponding child process object by using the parent process object, wherein the at least one corresponding child process object is allocated a maximum input/output (I/O) bandwidth threshold;
    sending, by using the parent process object, a child process identifier of the child process object and the maximum I/O bandwidth threshold to the operating system kernel layer to prompt the operating system kernel layer to create a traffic limiting rule corresponding to the child process object;
    pre-creating a socket descriptor by using the parent process object, wherein the socket descriptor is information that is used when the child process object creates a network connection socket;
    sending the socket descriptor and the child process identifier of the child process object to the operating system kernel layer by using the parent process object, and sending the socket descriptor to the child process object by using the parent process object; and
    prompting, when it is detected that the child process object inputs or outputs a network data packet by using the socket descriptor, the operating system kernel layer to evaluate data traffic of the network data packet using the socket descriptor.

2. The method according to claim 1, wherein prompting the operating system kernel layer to evaluate data traffic of the network data packet using the socket descriptor further comprises:
    obtaining, by the operating system kernel layer, a corresponding socket structure according to the socket descriptor and the child process identifier of the child process object;

adding the child process identifier to the network data packet when the network data packet passes through the socket structure; and searching, based on the child process identifier, for a traffic limiting rule that matches the network data packet, to obtain the maximum I/O bandwidth threshold corresponding to the child process object, and limiting data traffic of the network data packet according to the maximum I/O bandwidth threshold.

3. The method according to claim 1, further comprising:
adaptively adjusting the maximum I/O bandwidth threshold of the child process object, wherein adaptively adjusting the maximum I/O bandwidth further comprises:
  determining a maximum I/O bandwidth threshold of a parent level, wherein the parent level is an object above the level of the child process object;
  determining, if the total of maximum I/O bandwidth thresholds of all child process objects included in the parent level is greater than the maximum I/O bandwidth threshold of the parent level, a first average bandwidth threshold allocated for each of the child process objects according to a number of the child process objects; and
  keeping the maximum I/O bandwidth threshold of the child process object unchanged, if the maximum I/O bandwidth threshold of the child process object is less than the first average bandwidth threshold, or
  determining a second average bandwidth threshold if the maximum I/O bandwidth threshold of the child process object is greater than the first average bandwidth threshold, and adjusting the maximum I/O bandwidth threshold of the child process object to the second average bandwidth threshold.

4. The method according to claim 3, wherein the second average bandwidth threshold is calculated in the following manner:

(the maximum I/O bandwidth threshold of the parent level−all maximum I/O bandwidth thresholds of child process objects whose maximum I/O bandwidth thresholds are less than the first average bandwidth threshold) / (the number of child process objects whose maximum I/O bandwidth thresholds are greater than the first average bandwidth threshold).

5. A method for limiting data traffic, wherein the method comprises:
  receiving, at an operating system kernel layer, a maximum I/O bandwidth threshold corresponding to a child process object sent by a parent process object, wherein the parent process object is associated with a service object, the child process object is a process object created by using the parent process object, and the maximum I/O bandwidth threshold is a bandwidth threshold allocated for the child process object when the child process object is created by the parent process object;
  creating a traffic limiting rule corresponding to the child process object, wherein the traffic limiting rule includes the child process identifier of the child process object and the maximum I/O bandwidth threshold;
  receiving a pre-created socket descriptor and the child process identifier of the child process object that are sent by the parent process object, wherein the socket descriptor is information that is used when the child process object creates a network connection socket;
  acquiring a corresponding socket structure according to the socket descriptor and the child process identifier of the child process object;
  receiving a network data packet that is input or output by the child process object by using the socket descriptor;
  adding the child process identifier to the network data packet when the network data packet passes through the socket structure; and
  searching, based on the child process identifier, for a traffic limiting rule that matches the network data packet to obtain the maximum I/O bandwidth threshold corresponding to the child process object, and limiting data traffic of the network data packet according to the maximum I/O bandwidth threshold.

6. The method according to claim 5, wherein searching, based on the child process identifier, for a traffic limiting rule that matches the network data packet to obtain the maximum I/O bandwidth threshold corresponding to the child process object, and limiting data traffic of the network data packet according to the maximum I/O bandwidth threshold comprises:
  acquiring data traffic of the network data packet;
  searching, based on the child process identifier, for a traffic limiting vile that matches the network data packet to obtain the maximum I/O bandwidth threshold; and
  transmitting the network data packet according to the data traffic if the data traffic is less than the maximum I/O bandwidth threshold, or
  transmitting the network data packet according to the maximum I/O bandwidth threshold if the data traffic is greater than the maximum I/O bandwidth threshold.

7. The method according to claim 6, further comprising:
placing, if the data traffic is greater than the maximum I/O bandwidth threshold, data corresponding to remaining data traffic in the data traffic other than the maximum I/O bandwidth threshold in a buffer of a preset size; and
sending an error prompt to the child process object if the amount of data stored in the buffer is the preset size.

8. The method according to claim 5, further comprising:
deleting the corresponding traffic limiting rule if it is detected that the child process object is deleted.

9. A system for limiting data traffic, wherein the system comprises:
  a memory comprising instructions; and
  at least one processor configured to execute the instructions to cause the system to:
    determine, at an application layer, a parent process object corresponding to a service object;
    create a child process object by using the parent process object, wherein the child process object is allocated a maximum I/O bandwidth threshold;
    send, by using the parent process object, a child process identifier of the child process object and the maximum I/O bandwidth threshold to the operating system kernel layer to prompt the operating system kernel layer to create a traffic limiting rule corresponding to the child process object;
    pre-create a socket descriptor by using the parent process object, wherein the socket descriptor is information that is used when the child process object creates a network connection socket;
    send the socket descriptor and the child process identifier of the child process object to the operating system kernel layer by using the parent process object, and sending the socket descriptor to the child process object by using the parent process object; and prompt, when it is detected that the child process object inputs or outputs a network data packet by using the socket descriptor, the operating system kernel layer to evaluate data traffic of the network data packet using the socket descriptor.

10. A system for limiting data traffic, wherein the system comprises:

a memory storing instructions; and at least one processor configured to execute the instructions to cause the system to:

receive, at an operating system kernel layer, a maximum I/O bandwidth threshold corresponding to a child process object sent by a parent process object, wherein the parent process object is associated with a service object, the child process object is a process object created by using the parent process object, and the maximum I/O bandwidth threshold is a bandwidth threshold allocated for the child process object when the child process object is created by the parent process object;

create a traffic limiting rule corresponding to the child process object, wherein the traffic limiting rule includes the child process identifier of the child process object and the maximum I/O bandwidth threshold;

receive a pre-created socket descriptor and the child process identifier of the child process object that are sent by the parent process object, wherein the socket descriptor is information that is used when the child process object creates a network connection socket;

acquire a corresponding socket structure according to the socket descriptor and the child process identifier of the child process object;

receive a network data packet that is input or output by the child process object by using the socket descriptor;

add the child process identifier to the network data packet when the network data packet passes through the socket structure; and search, based on the child process identifier, for a traffic limiting rule that matches the network data packet to obtain the maximum I/O bandwidth threshold corresponding to the child process object, and limiting data traffic of the network data packet according to the maximum I/O bandwidth threshold.

11. A non-transitory computer readable medium that stores a set of instructions that is executable by at least one processor of a computer to cause the computer to perform a method for limiting data traffic, the method comprising:

determining, at an application layer, a parent process object corresponding to a service object;

creating at least one corresponding child process object by using the parent process object, wherein the at least one corresponding child process object is allocated a maximum input/output (I/O) bandwidth threshold;

sending, by using the parent process object, a child process identifier of the child process object and the maximum I/O bandwidth threshold to the operating system kernel layer to prompt the operating system kernel layer to create a traffic limiting rule corresponding to the child process object;

pre-creating a socket descriptor by using the parent process object, wherein the socket descriptor is information that is used when the child process object creates a network connection socket;

sending the socket descriptor and the child process identifier of the child process object to the operating system kernel layer by using the parent process object, and sending the socket descriptor to the child process object by using the parent process object; and prompting, when it is detected that the child process object inputs or outputs a network data packet by using the socket descriptor, the operating system kernel layer to evaluate data traffic of the network data packet using the socket descriptor.

12. The non-transitory computer readable medium according to claim 11, prompting the operating system kernel layer to evaluate data traffic of the network data packet using the socket descriptor further comprises:

obtaining a corresponding socket structure according to the socket descriptor and the child process identifier of the child process object;

adding the child process identifier to the network data packet when the network data packet passes through the socket structure; and searching, based on the child process identifier, for a traffic limiting rule that matches the network data packet, to obtain the maximum I/O bandwidth threshold corresponding to the child process object, and limiting data traffic of the network data packet according to the maximum I/O bandwidth threshold.

13. The non-transitory computer readable medium according to claim 11, wherein the set of instructions that is executable by the at least one processor of the computer causes the computer to further perform:

adaptively adjusting the maximum I/O bandwidth threshold of the child process object, wherein adaptively adjusting the maximum I/O bandwidth further comprises:

determining a maximum I/O bandwidth threshold of a parent level, wherein the parent level is an object above the level of the child process object;

determining, if the total of maximum I/O bandwidth thresholds of all child process objects included in the parent level is greater than the maximum I/O bandwidth threshold of the parent level, a first average bandwidth threshold allocated for each of the child process objects according to a number of the child process objects; and keeping the maximum I/O bandwidth threshold of the child process object unchanged, if the maximum I/O bandwidth threshold of the child process object is less than the first average bandwidth threshold, or determining a second average bandwidth threshold if the maximum I/O bandwidth threshold of the child process object is greater than the first average bandwidth threshold, and adjusting the maximum I/O bandwidth threshold of the child process object to the second average bandwidth threshold.

14. The non-transitory computer readable medium according to claim 13, wherein the second average bandwidth threshold is calculated in the following manner:

> (the maximum I/O bandwidth threshold of the parent level–all maximum I/O bandwidth thresholds of child process objects whose maximum I/O bandwidth thresholds are less than the first average bandwidth threshold) / (the number of child process objects whose maximum I/O bandwidth thresholds are greater than the first average bandwidth threshold).

15. A non-transitory computer readable medium that stores a set of instructions that is executable by at least one processor of a computer to cause the computer to perform a method for limiting data traffic, the method comprising:
- receiving, at an operating system kernel layer, a maximum I/O bandwidth threshold corresponding to a child process object sent by a parent process object, wherein the parent process object is associated with a service object, the child process object is a process object created by using the parent process object, and the maximum I/O bandwidth threshold is a bandwidth threshold allocated for the child process object when the child process object is created by the parent process object;
- creating a traffic limiting rule corresponding to the child process object, wherein the traffic limiting rule includes the child process identifier of the child process object and the maximum I/O bandwidth threshold;
- receiving a pre-created socket descriptor and the child process identifier of the child process object that are sent by the parent process object, wherein the socket descriptor is information that is used when the child process object creates a network connection socket;
- acquiring a corresponding socket structure according to the socket descriptor and the child process identifier of the child process object;
- receiving a network data packet that is input or output by the child process object by using the socket descriptor;
- adding the child process identifier to the network data packet when the network data packet passes through the socket structure; and
- searching, based on the child process identifier, for a traffic limiting rule that matches the network data packet to obtain the maximum I/O bandwidth threshold corresponding to the child process object, and limiting data traffic of the network data packet according to the maximum I/O bandwidth threshold.

16. The non-transitory computer readable medium according to claim 15, wherein searching, based on the child process identifier, for a traffic limiting rule that matches the network data packet to obtain the maximum I/O bandwidth threshold corresponding to the child process object, and limiting data traffic of the network data packet according to the maximum I/O bandwidth threshold comprises:
- acquiring data traffic of the network data packet;
- searching, based on the child process identifier, for a traffic limiting rule that matches the network data packet to obtain the maximum I/O bandwidth threshold; and
- transmitting the network data packet according to the data traffic if the data traffic is less than the maximum I/O bandwidth threshold, or
- transmitting the network data packet according to the maximum I/O bandwidth threshold if the data traffic is greater than the maximum I/O bandwidth threshold.

17. The non-transitory computer readable medium according to claim 16, wherein the set of instructions that is executable by the at least one processor of the computer causes the computer to further perform:
- placing, if the data traffic is greater than the maximum I/O bandwidth threshold, data corresponding to remaining data traffic in the data traffic other than the maximum I/O bandwidth threshold in a buffer of a preset size; and
- sending an error prompt to the child process object if the amount of data stored in the buffer is the preset size.

18. The non-transitory computer readable medium according to claim 15, wherein the set of instructions that is executable by the at least one processor the computer causes the computer to further perform:
- deleting the corresponding traffic limiting rule if it is detected that the child process object is deleted.

* * * * *